Sept. 19, 1939.    L. L. SMALLEY    2,173,597
AUTOMOTIVE SERVICE APPARATUS
Filed Dec. 30, 1936    6 Sheets-Sheet 1

INVENTOR
LEE L. SMALLEY
BY
A. E. Wilson.
ATTORNEY

Sept. 19, 1939.  L. L. SMALLEY  2,173,597
AUTOMOTIVE SERVICE APPARATUS
Filed Dec. 30, 1936   6 Sheets-Sheet 2

INVENTOR
LEE L SMALLEY
BY A. E. Wilson
ATTORNEY

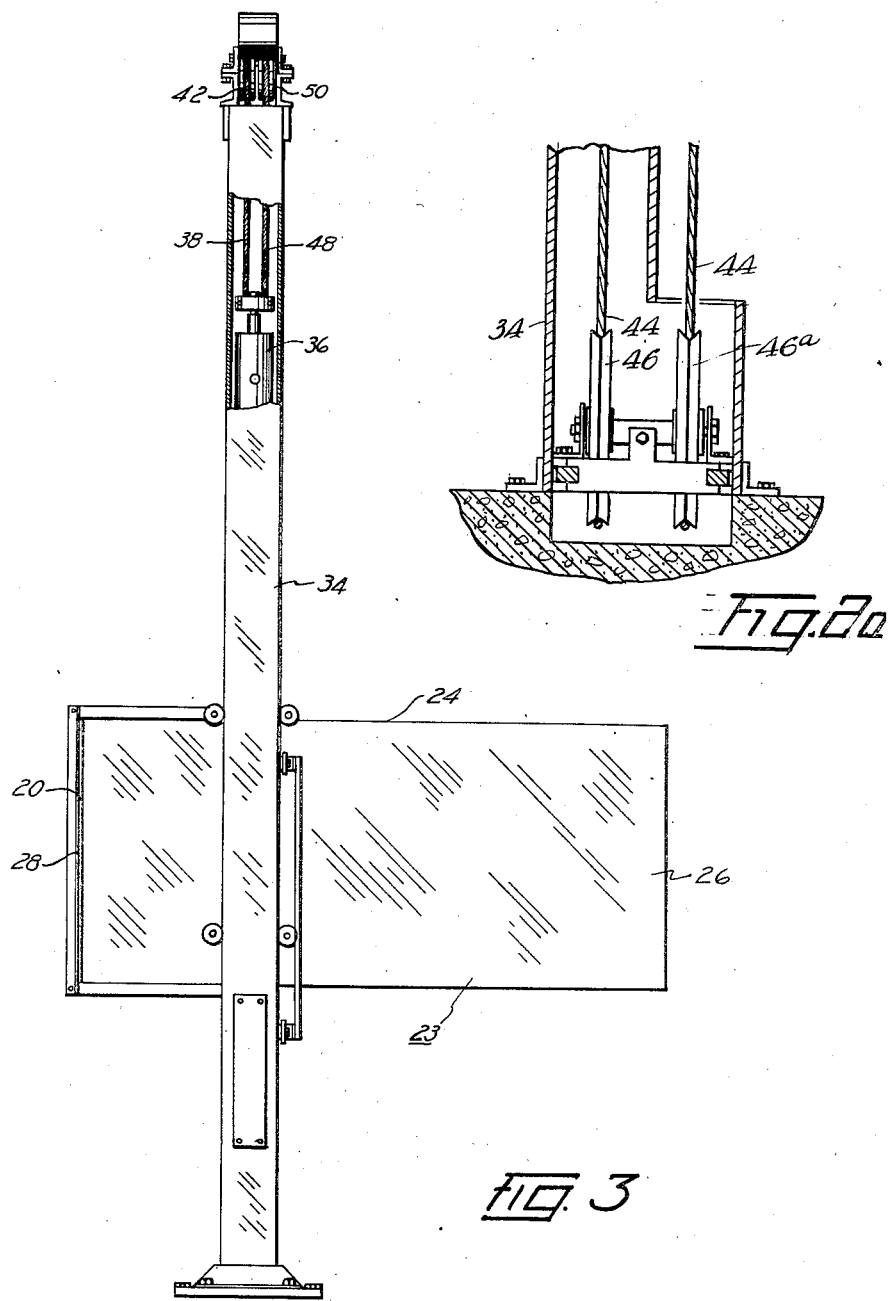

Sept. 19, 1939.  L. L. SMALLEY  2,173,597
AUTOMOTIVE SERVICE APPARATUS
Filed Dec. 30, 1936  6 Sheets-Sheet 4
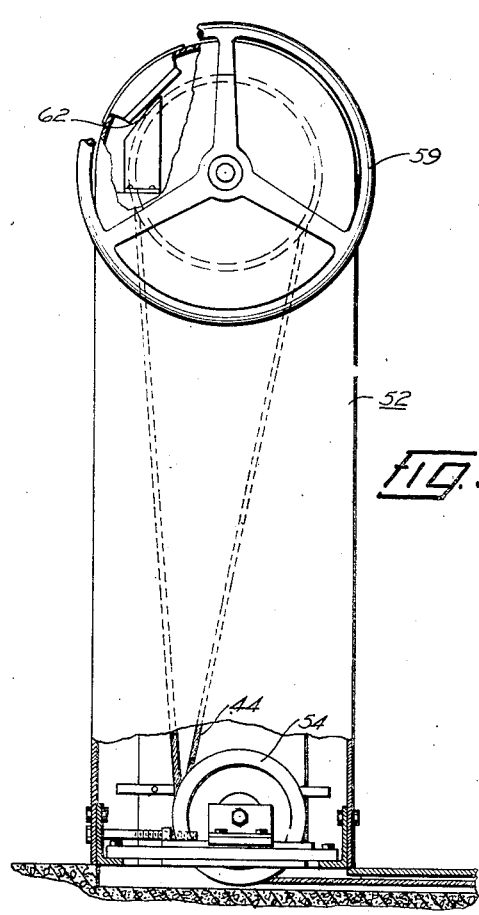
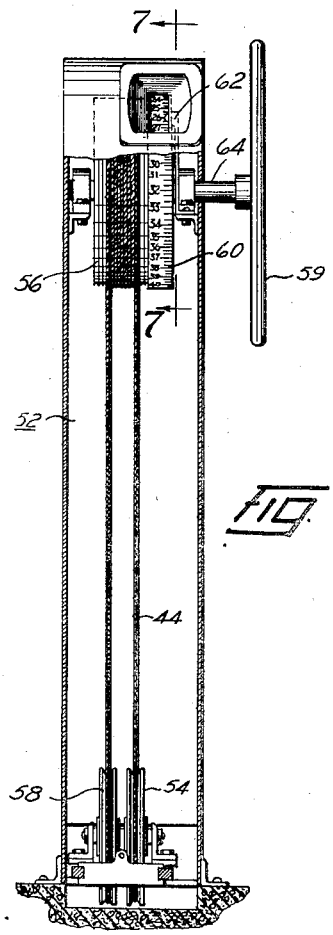
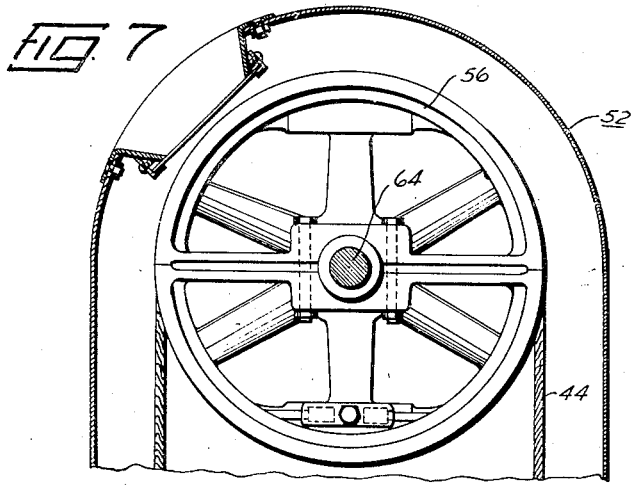
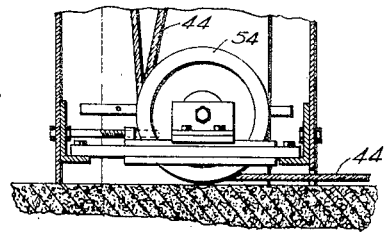
INVENTOR
LEE L. SMALLEY
BY
A. E. Wilson
ATTORNEY

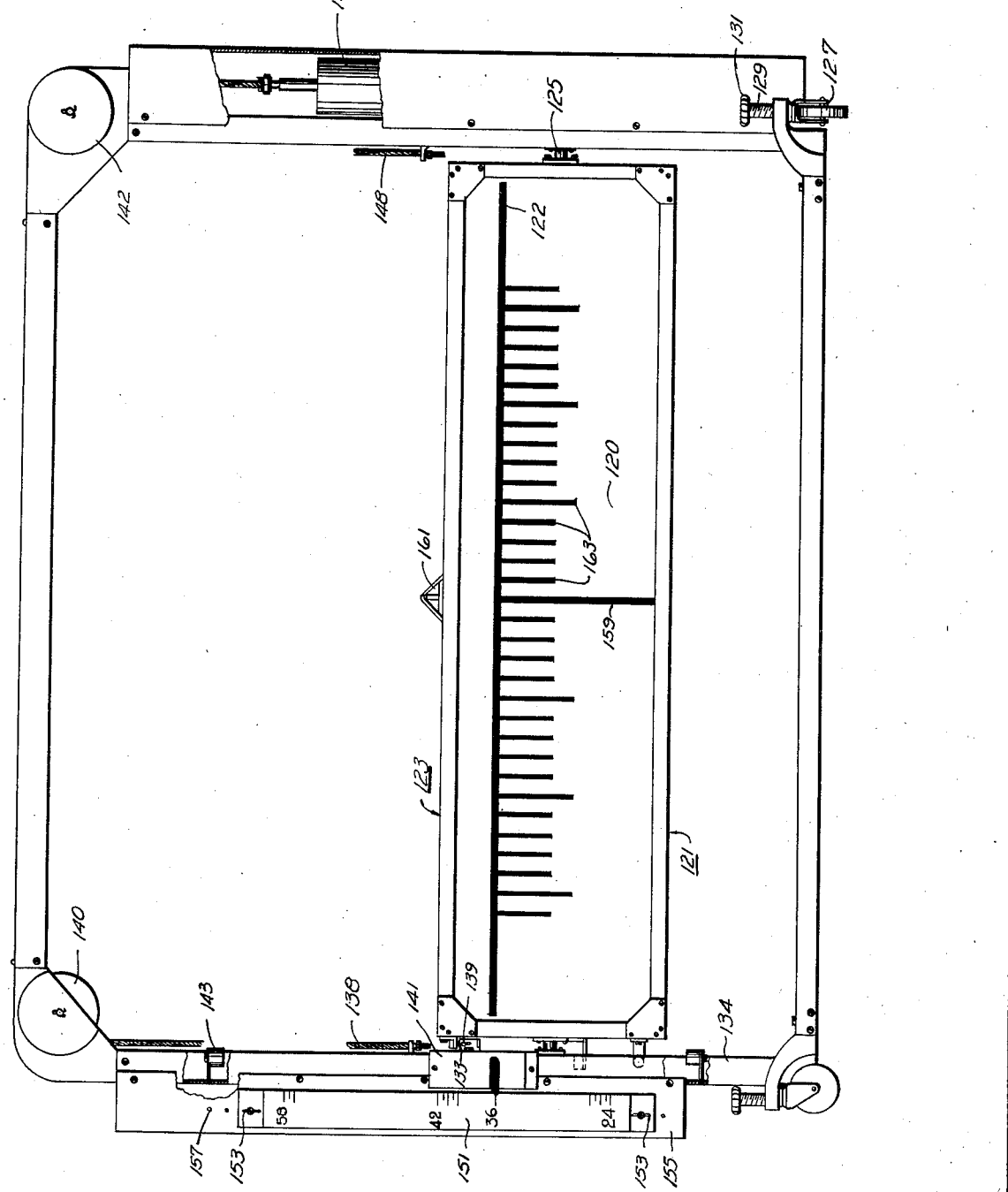

Sept. 19, 1939.　　　L. L. SMALLEY　　　2,173,597
AUTOMOTIVE SERVICE APPARATUS
Filed Dec. 30, 1936　　　6 Sheets-Sheet 6
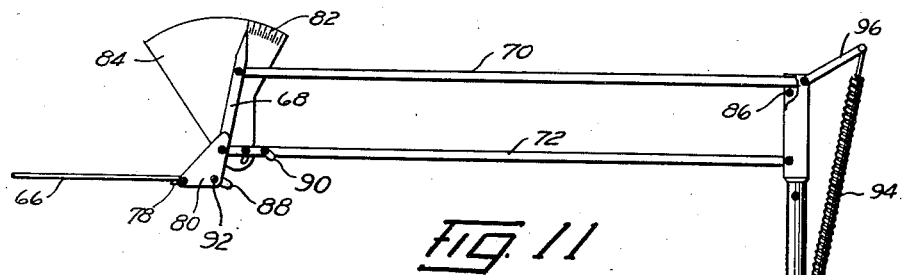
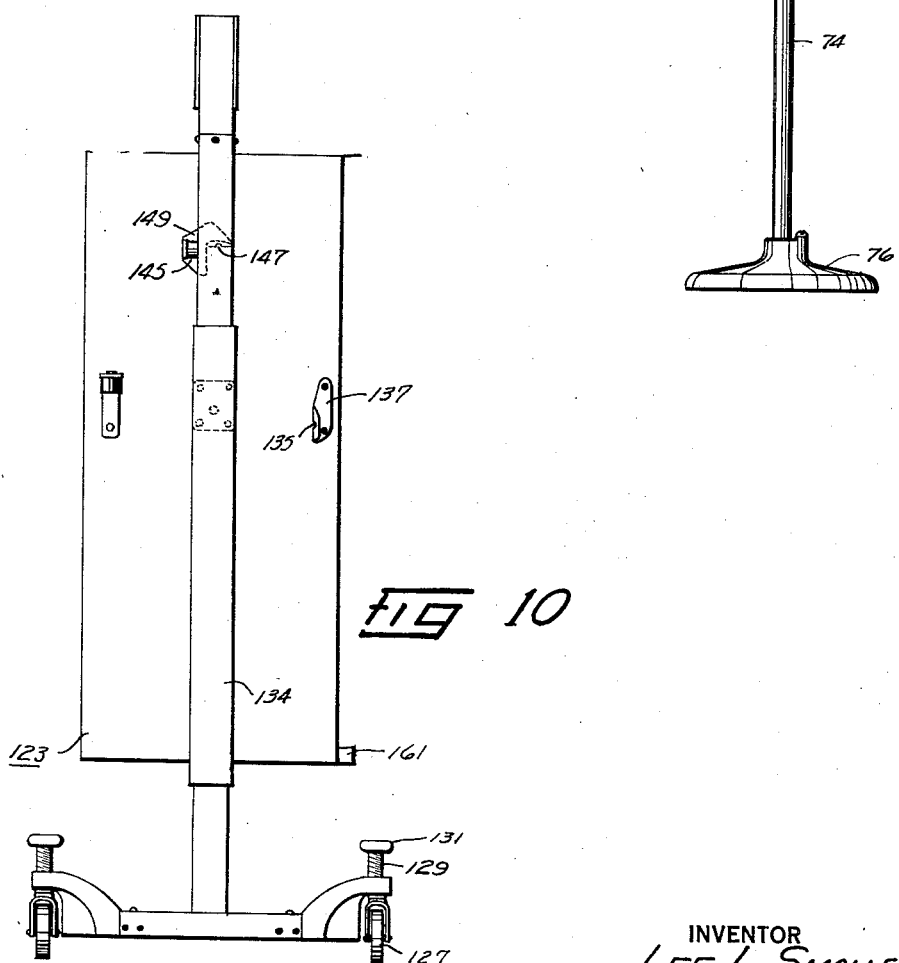
INVENTOR
LEE L. SMALLEY
BY
ATTORNEY Patented Sept. 19, 1939

2,173,597

UNITED STATES PATENT OFFICE 2,173,597

AUTOMOTIVE SERVICE APPARATUS

Lee L. Smalley, South Bend, Ind., assignor to Bendix Products Corporation, South Bend, Ind., a corporation of Indiana Application December 30, 1936, Serial No. 118,317

1 Claim. (Cl. 33—180)

This invention relates to apparatus for testing the headlights of motor vehicles.

In the construction of headlights for automotive vehicles it is common practice to employ an electric bulb or lamp to supply a source of light. A reflector is positioned behind the bulb to reflect the light rays, and to transmit them from the mouth of the reflector in parallel lines or shafts somewhat in the form of a cylinder. If the light source is behind the focal point of the reflector, the rays of light diverge, thereby producing a blind spot in the central portion of the shaft of light. If the light source is ahead of the focal point of the reflector, the rays of light converge and cross, thereby producing a blind spot in the central portion at a shaft of light of the distance from the headlight. In an effort to avoid these difficulties certain manufacturers of headlights have resorted to focusing devices whereby the bulb may be moved longitudinally with reference to the reflector until the focal point is reached.

The cylindrical shaft of light directed by a reflector is too concentrated and narrow to properly light the road, and also blinds the occupants of vehicles travelling in the opposite direction on the highway. A lens is therefore employed to distribute the shaft of light in such a manner as to produce more uniform lighting of the highway and to confine the principal portion of the shaft of light below a horizontal plane parallel to the road surface. Many different forms of lenses, having various combinations of prisms or flutes may be employed to diffuse the light vertically and horizontally in a desired manner.

The lighting equipment of vehicles is normally subjected to rather severe operating conditions, which tend to alter the adjustment thereof to misdirect the light, resulting in a hazard to the operator of the vehicle and to others travelling the highway.

An object of this invention is to provide means for checking the lighting equipment of motor vehicles to determine whether it is in proper operating condition.

A further object of the invention is to provide a movable screen which may be calibrated to determine whether the focus of the lights is correct, and whether the shafts of light emanated from the headlights are directed in the right direction.

A still further object of the invention is to provide a headlight testing screen shielded by a horizontally disposed tunnel whereby the screen may be employed to test headlights in the daytime.

Another object of this invention is to provide a vertically movable tunnel and screen which may be set at any desired height to correspond to the height of the headlights on the vehicle being tested, and to compensate for the loading allowance, or the variation of the effective angle of the light when the vehicle is loaded and when it is not loaded.

A still further object is to provide a headlight tester having a counterweighted vertically movable tunnel and screen which may be raised when not in use so that the space normally occupied when testing lights may be available for other purposes.

Yet a further object of the invention is to provide a remote control device for raising and lowering the tunnel and screen from a point in the vicinity of the vehicle being checked to enable the headlights to be tested by a single inspector who does not need to leave the vicinity of the vehicle being tested.

Another object of the invention is to provide a portable headlight tester having a vertically movable tunnel and screen which may be readily moved from place to place for testing purposes, and wherein the tunnel may be folded vertically to occupy the minimum space when the tester is not in use.

A further object of this invention resides in the provision of a fixed horizontally disposed vertically movable member to accurately measure the height of the headlight above the floor level, and which may be moved to a vertical position, out of the way, when not in use.

A still further object of the invention is to provide an adjustable remote control device whereby the vertical position of the movable tunnel and screen may be accurately determined at a distance therefrom.

Other objects and advantages of this invention will be apparent from the following detailed description of two desirable embodiments thereof, considered in connection with the accompanying drawings submitted for purposes of illustration only and not intended to define the scope of the invention, reference being had for that purpose to the subjoined claim.

In the drawings, wherein similar reference characters refer to similar parts throughout the several views:

Figure 2a is a fragmentary view in section of a portion of Fig. 2 wherein the remote control cable projects below the floor.

Figure 3 is a side elevation, partly in section, of the device shown in Figure 2;

Figure 4 is a top view of the device shown in Figures 2 and 3;

Figure 5 is a side elevation, partly in section, of the remote control device shown in Figure 1;

Figure 6 is a side elevation, partly in section of the device shown in Figure 5;

Figure 7 is a view taken on the line 7—7 of Figure 6;

Figure 8 is a sectional view, corresponding to a portion of Figure 5 wherein the remote control cable projects above the floor level;

Figure 9 is a front view of a portable headlight tester in operative position;

Figure 10 is a side elevation of the device illustrated in Figure 9 wherein the tunnel and screen is folded vertically; and Figure 11 is a front view of the height measuring device illustrated in Figure 1.

Figure 1:
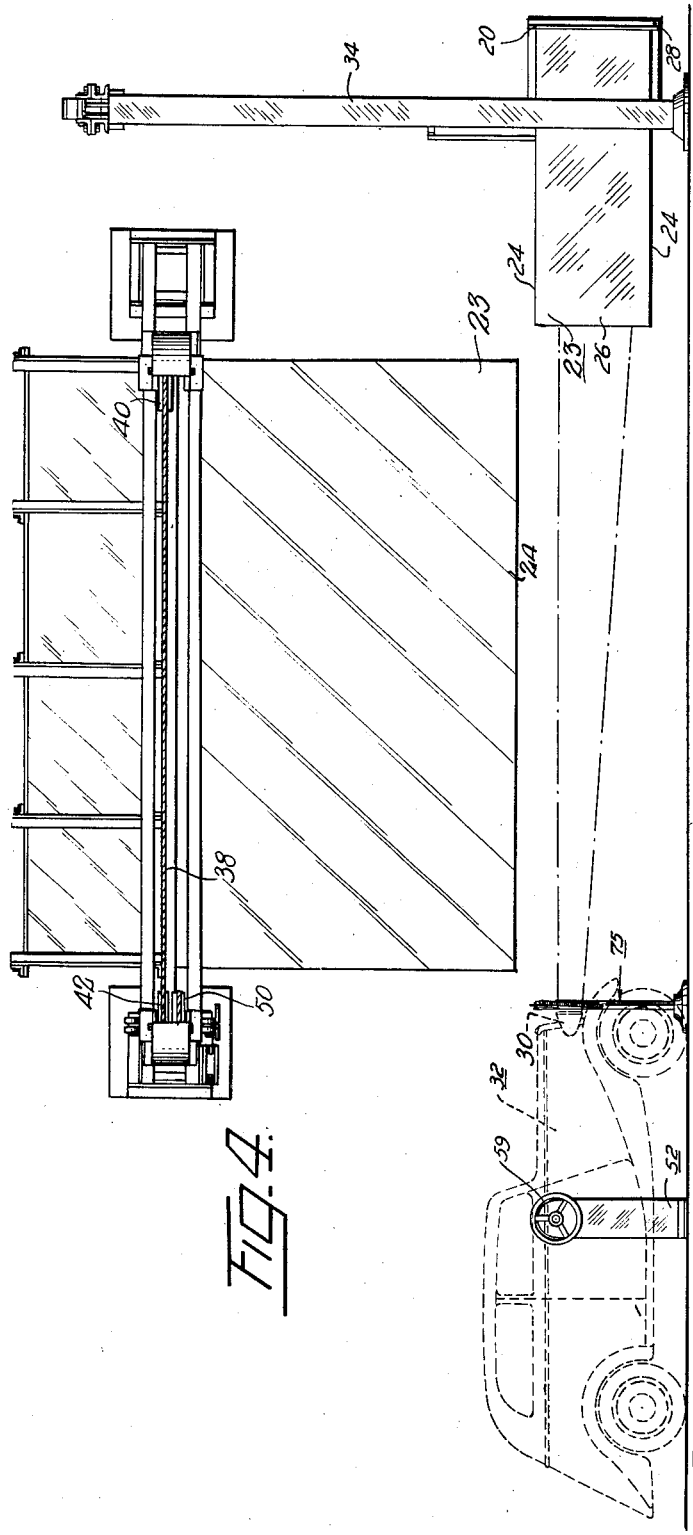
Figure 1 is a side view of a headlight tester in operative position.
Figure 2:
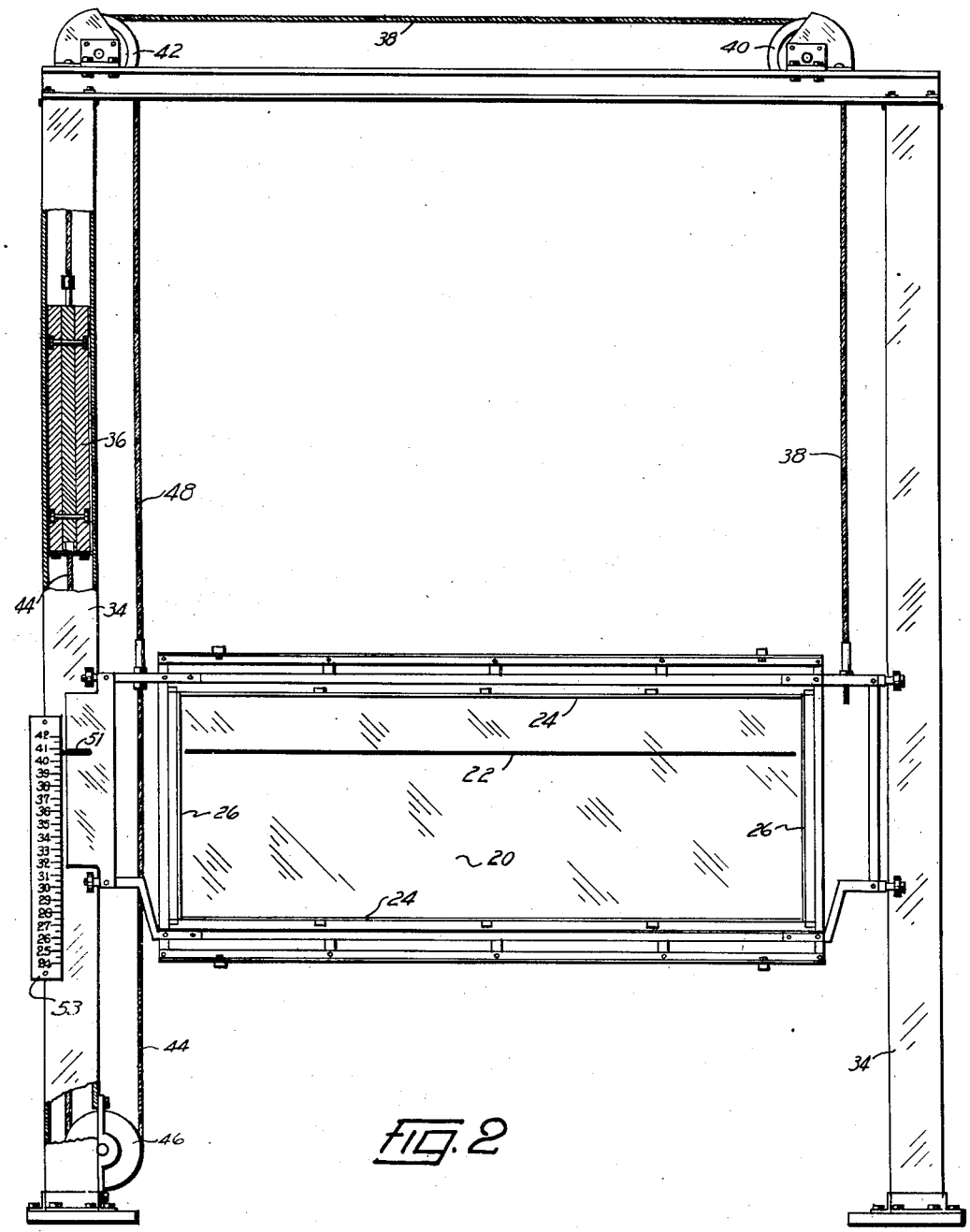
Figure 2 is a front elevation, partly in section, of the tester shown in Figure 1.

Referring more particularly to the embodiment of the invention shown in Figures 1 to 7, there is shown, for purposes of illustrating this invention, a vertically disposed screen 20, having a horizontal line 22 thereon. The screen 20 is shielded by a horizontally disposed tunnel 23 which may be of any desired form such as that formed by horizontally disposed wall members 24 and vertically disposed wall members 26. The back of the screen 20 is shielded by a vertically disposed wall member 28. The tunnel and wall board prevent all light from impinging on the screen 20 except that directed from the front. It is therefore possible to test headlights in the daytime.

Referring to Figure 1, it will be observed that the directed light from a pair of headlights 30 of a vehicle 32, positioned at any desired distance, for example, twenty-five feet from the screen 20, is projected into the tunnel to impinge on the screen 20 to indicate whether the lights are in proper adjustment.

The screen 20 and tunnel 23 are positioned to move vertically between supports 34 which may be fixed to the floor. Counterweight 36 may be positioned in the supports 34 to balance the weight of the screen and tunnel, to facilitate raising and lowering the unit. A cable 38, connected to the framework supporting the screen and tunnel passes over pulleys 40, 42 and connects to the counterweight 36. Another cable 48 connected to the counterweight 36 passes over a pulley 50 and connects with the opposite side of the framework supporting the screen and tunnel. A third cable 44 connected to the framework adjacent the cable 48 passes around a pulley 46 and connects with the counterweight 36.

The screen 20 and tunnel 23 are thus freely suspended and are vertically movable with minimum resistance. The unit may be manually moved to any desired position, and due to the balancing of the unit it will remain in any position to which it is moved.

The height of the horizontal line 22 on the screen 20 above the floor level or with reference to the height of the headlight 30 may be accurately indicated by observing the position of a pointer 51, carried by the framework supporting the screen 20, with reference to a scale 53 carried by one of the supports 34.

If desired a remote control device such as the one illustrated in Figures 1, 2a and 5 to 7 may be employed. In this embodiment the pulley 46 is lowered with reference to the support 34 and rotated through ninety degrees. The cable 44 is directed from the pulley 46, preferably under the floor level, to a manually operated control member 52 positioned adjacent the vehicle 32. The cable 44 passes over a pulley 54 and is directed upwardly and wound several times around a drum 56. The cable is then directed downwardly over another pulley 58 and is then directed back to pass over a pulley 46a adjacent the pulley 46, thence to connect with the framework supporting the screen and tunnel.

The drum 56 may be manually operated to raise and lower the screen and tunnel by manipulating the hand wheel 59 operably connected therewith. The drum is also provided with a calibrated scale 60 which cooperates with a pointer 62 to indicate the elevation of the horizontal line 22 of the screen 20 above floor level. The scale 60 may be zeroed with reference to the height of the line 22 of the screen 20 by loosening the drum 56 on the shaft 64 and allowing relative movement between the drum and shaft.

As illustrated in Figure 8 the cable 44 interconnecting the screen and the remote control device may travel above the floor level if desired. It will of course be understood that if this expedient is resorted to the pulleys 46 and 54 are not positioned as low in their respective members as when the cable travels beneath the surface of the floor.

The height from the floor to the center of the bulb in the headlight 30 may be accurately determined by means of the height measuring device 75 illustrated in Figure 11. A generally horizontally disposed arm 66 is pivotally mounted on a pointer 68. The pointer 68 is pivotally mounted on and carried by a pair of links 70 and 72 as illustrated in Figure 11. The links 70 and 72 are pivotally mounted on a support 74 having a base 76 of any desired type. A parallelogram is formed by the pointer 68 and the links 70 and 72 carried by the support 74. The arm 66 is pivotally mounted on the lower end of the pointer 68 and is supported by a stop 78 carried by the generally triangular reinforcing segments 80. The pointer 68 moves over a scale 82 on a segment 84 to indicate the height of the arm 66 above the bottom of the base 76.

When not in use this height measuring device may be moved to a vertical position to avoid obstructing the space adjacent the headlights being tested. To move the device to the vertical position it is only necessary to grasp the horizontal portion and move it upwardly. The links 70 and 72 rotate about their respective pivots until the link 72 engages a stop 86 in the support 74. The pointer 68 moves upwardly in a generally vertically disposed direction. Toward the end of the vertical travel a stop 88 carried by the arm 66 engages with a stop 90 on the link 72 and rotates the arm 66 about its pivot point 92 to the vertical position. A spring 94 interconnecting the support 74 and an arm 96 carried by the link 70 holds the assembly in the vertical position, and also acts to counterbalance the movable structure when in operating position.

The operation of the device thus far described is as follows. The vehicle 32 is positioned adjacent the remote control mechanism 52 as shown in Figure 1. The height measuring device 75 is then employed to ascertain the height of the bulb of the headlight 30 above the floor level.

by depressing or elevating the links 70 and 72 until the arm 66 is horizontal with the center of the bulb of the headlight 30. The height of the center of the headlight bulb above the level of the floor may then be determined by observing the position of the end of the pointer 68 with reference to the scale 82. When this height is determined the handwheel 59 of the remote control device 52 is actuated to move the screen 20 to a height corresponding to that of the headlight. If a loading allowance is to be used it is of course accounted for in the positioning of the screen 20.

The lights are then turned on and the screen 20 is viewed to determine where the area of greatest intensity of the light falls. The light rays should form an elliptical pattern on the screen wherein the area of greatest intensity lies below the horizontal line 22 and generally in front of the particular light being tested. Each headlight may be tested individually and then both may be tested simultaneously. If the focus, aim or other characteristics of the light do not conform to proper standards, suitable corrections can be made in the lighting equipment, whereupon they may be rechecked to ascertain whether the corrections accomplished the desired results.

Figures 9 and 10 illustrate a portable headlight tester which is similar in many respects to the embodiment illustrated in Figures 1 to 4, corresponding parts having therefore been given corresponding reference numerals with the addition of 100.

In this embodiment of the invention the unit 121 comprising the screen 120 and the tunnel 123 is pivotally mounted on trunnions 125 carried by the supports 134. The supports 134 are mounted on casters 127, which may be adjusted vertically to level the device by means of screws 129 having the handwheels 131 thereon. The tunnel 123 may be locked in the horizontal position by means of a spring pressed plunger 133 carried by a member 141 which moves with the tunnel 123, engaging in a notch 135 formed in a locking bracket 137 carried by the tunnel 123.

When the device is not in use the tunnel 123 may be rotated about the trunnions 125 to the vertical position as shown in Figure 10 wherein the open end of the tunnel 123 is directed downwardly. The device then occupies less space for storage purposes than when the tunnel 123 is in the horizontal or operative position.

To rotate the tunnel 123 it is moved upwardly between the supports 134 until the top of the member 141 engages a resilient bumper 143 carried by the supports 134. The spring pressed plunger 133 is then withdrawn from the notch 135 in the bracket 137 by pushing downwardly on a projection 139 operably connected to the plunger 133. The tunnel is then released and is rotated to the vertical position, whereupon resilient bumpers 145 engage the supports 134 to limit the rotation of the tunnel, and the plunger 133 engages in a notch 147 formed in a locking bracket 149 carried by the tunnel to lock the unit in the vertical position.

Since it frequently happens that the portable tester is positioned at one floor level while the vehicle, the headlights of which are being tested, is at another floor level, means have been provided to move the height indicating scale 151 carried by the support 134 vertically to accurately align the horizontal line 122 of the screen 120 with reference to the center of the headlights being tested. The scale 151 is sidably mounted in slots 153 in a member 155 fixed to the support 134. The scale 151 may be supported on the member 155 at any desired height by employing different apertures 157 in the member 155.

In the operation of this device the vehicle is positioned at the desired distance from the screen 120 and is centered with reference to a vertically disposed line 159 in the central portion of the screen 120. A sight 161 on the tunnel 123 may be employed to align the vehicle, or the centerline of the hood of the vehicle may be employed for sighting purposes. A plurality of graduated vertical lines 163 on the screen 120 may be employed to more accurately ascertain the position of the light pattern of the headlights. The operation of the portable machine is substantially the same from this point as for the one previously described.

The screen 120 and the tunnel 123 may be formed of any desired material such as metal or fabric.

While the invention has been described with particular reference to two desirable embodiments thereof, it is to be understood that the disclosures are intended to be illustrative, and that various changes may be made in the specific arrangements without departing from the spirit of the following claim.

I claim:

In a headlight tester, a pair of spaced supports, a vertically disposed focusing screen positioned between the supports on which the lights to be tested are focused, a rectangularly shaped box-like means constituting a tunnel enclosing the screen and serving to shield the same from all light except that entering the tunnel at one end thereof, means for securing the tunnel and screen to the supports to enable the tunnel and screen to be vertically moved as a unit upwardly and downwardly to effect the testing operation, means for indicating the height of the screen comprising a scale carried by one of the supports together with an indicator carried by the unit and cooperable with said scale, means for controlling the vertical upward and downward movement of the tunnel and screen comprising a remotely positioned, manually controllable member adjacent the vehicle the headlights of which are being tested, means for connecting the last named member with the tunnel and screen so as to move the latter as a unit upwardly and downwardly to effect the testing operation, scale means associated with said last named member for similarly indicating adjacent said member the height of the screen, and a counterbalancing weight device secured to the screen for maintaining the latter in any position of vertical adjustment.

LEE L. SMALLEY.